United States Patent [19]

Ishii et al.

[11] Patent Number: 4,619,965

[45] Date of Patent: Oct. 28, 1986

[54] DISPERSION STABILIZER AND ITS USE

[75] Inventors: Keizou Ishii, Ashiya; Takeo Kurauchi, Neyagawa; Jun Nozue, Hirakata; Shinichi Ishikura, Kyoto, all of Japan

[73] Assignee: Nippon Paint Co., Ltd., Osaka, Japan

[21] Appl. No.: 833,514

[22] Filed: Feb. 21, 1986

Related U.S. Application Data

[63] Continuation of Ser. No. 647,145, Sep. 4, 1984, abandoned.

[30] Foreign Application Priority Data

Jul. 19, 1984 [JP] Japan ................................. 59-150949

[51] Int. Cl.$^4$ ............................................. C08L 41/00
[52] U.S. Cl. .................................... 524/547; 526/274; 526/275; 526/276; 526/277; 526/278; 526/286; 526/287; 526/288

[58] Field of Search ................. 524/547; 526/277, 278, 526/275, 276, 287, 288, 286, 274

[56] References Cited

U.S. PATENT DOCUMENTS

| | | | |
|---|---|---|---|
| 3,478,001 | 11/1969 | Szita et al. ........................... | 526/288 |
| 3,671,502 | 6/1972 | Samour et al. ....................... | 526/288 |
| 3,687,886 | 8/1972 | Dietler et al. ....................... | 526/288 |
| 4,309,327 | 1/1982 | Ishikura et al. ..................... | 526/287 |
| 4,419,344 | 12/1983 | Strasilla et al. ..................... | 526/287 |
| 4,440,744 | 4/1984 | Strasilla et al. ..................... | 526/287 |

Primary Examiner—Paul R. Michl
Assistant Examiner—Alex H. Walker
Attorney, Agent, or Firm—Wenderoth, Lind & Ponack

[57] ABSTRACT

A dispersion stabilizer for dispersing solid particles into a liquid medium, which comprises resin particles bearing a zwitter-ionic group in the molecule, said resin particles each having substantially an average particle size of not more than 1500 Å when measured by electron microscopic observation.

18 Claims, No Drawings

DISPERSION STABILIZER AND ITS USE

This application is a continuation, of application Ser. No. 647,145, filed Sept. 4, 1984 now abondoned.

The present invention relates to a dispersion stabilizer and its use. More particularly, it relates to a dispersion stabilizer for dispersing solid particles stably into a liquid medium, and its use.

The dispersion stablizer of the invention can be used generally for dispersing solid particles such as organic or inorganic pigment particles, polymeric particles and filler particles stably into a liquid medium, while it is particularly useful for dispersing pigment particles into a liquid medium containing a film-forming resin so as to assure a stable dispersion state of the pigment particles. Accordingly, this invention will be hereinafter explained in detail by employing pigment particles as an example of the solid particles.

In general, a coating composition comprises a liquid medium such as water or an organic solvent, and a film-forming resin and a pigment evenly dispersed therein. One of the important problems in such coating composition is to maintain an evenly dispersed state of the pigment over a long period of time. In order to solve this problem, it has been proposed and it has been the practice to keep the stable dispersion state of the pigment by adsorption due to the functional group effect or molecular weight effect of the film-forming resin. Depending upon the kinds of the film-forming resin and the pigment, however, a sufficiently stable dispersion is hardly obtainable.

As a result of extensive study on the stable dispersion of a pigment, it has now been found that fine resin particles having a zwitter-ionic group in the molecule as produced by the present inventors are extremely effective in dispersing pigment particles evenly into a liquid medium and maintaining the evenly dispersed state of the pigment particles over a long period of time. The reason why said fine resin particles can exert such dispersion stabilization effect is still uncertain. However, it is presently assumed that the zwitter-ionic groups present on the surface of each fine resin particle are adsorbed strongly onto the surface of each pigment particle so that a thick stabilizing layer of the fine resin particles is formed around each pigment particle. Since the fine resin particles are so small in average particle size as substantially of not more than 1,500 Å when determined by the microscopic observation, said stabilizing layer is very tight and dense, and this may serve to maintain the dispersion stability over a long period of time.

As stated above, the fine resin particles can maintain the evenly and stably dispersed state of pigment particles in a coating composition over a long period of time. Further, the following characteristic features are recognized on the use of the fine resin particles as the dispersion stabilizer: (1) even such pigment particles as can be hardly dispersed in an organic coating composition (i.e. a coating composition using an organic sovlent as the liquid medium) can be uniformly and stably dispersed; (2) uniform and stable dispersing of pigment particles into a coating composition can be attained irrespective of said coating composition being aqueous or organic; (3) even such pigment particles having a relatively large particle size as metal flakes can be stably dispersed. Moreover, the coating composition obtained by the use of the fine resin particles as the dispersion stabilizer can afford a coating film, which is excellent in physical properties such as appearance, gloss and fairness.

According to the present invention, there is provided a dispersion stabilizer comprising fine resin particles having a zwitter-ionic group in the molecule. This dispersion stabilizer is useful for dispersing solid particles, particularly pigment particles, into a liquid medium, particularly an organic or aqueous coating composition.

There is also provided a pigment composition comprising a uniform mixture of said dispersion stabilizer and pigment particles. This pigment composition is useful for preparation of a coating composition comprising pigments particles uniformly and stably dispersed therein.

There is further provided a coating composition comprising a uniform mixture of said pigment composition and film-forming resin particles. This coating composition can afford a coating film having excellent physical properties on the surface of a substrate.

The dispersion stabilizer of the invention comprises fine resin particles having a zwitter-ionic group in the molecule. Such fine resin particles can be produced, for instance, by polymerizing a monomer having at least one polymerizable ethylenic unsaturation with or without any other monomer copolymerizable therewith in a liquid medium containing a dispersing agent having at least one zwitter-ionic group in the molecule in the presence of a polymerization initiator. The fine resin particles and their preparation procedures are disclosed in Japanese Patent Publn. (unexamined) Nos. 80386/1977, 80387/1977, 282/1978, 69554/1980, 21927/1982, 40504/1982, 139111/1982, 187301/1982, 187302/1982, 129066/1983, 129069/1983, etc.

The term "zwitter-ionic group" is intended to mean an atomic group comprising a positive group and a negative group which are equally ionized.

In the dispersing agent, the zwitter-ionic group may be present at a terminal or non-terminal (middle) position. Particularly preferred is the presence of the zwitter-ionic group at each terminal position. Typical examples of the zwitter-ionic group are as follows:

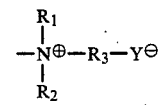

(wherein $R_1$ and $R_2$ are each an alkyl or cycloalkyl group having not more than 20 carbon atoms and optionally containing —O— and/or —COO— in the alkyl chain, or Rhd 1 and $R_2$ are combined together with the nitrogen atom to which they are attached to represent a nitrogen-containing heterocyclic group, $R_3$ is an alkylene group having not more than 8 carbon atoms and optionally containing any substituent and Y is $CO_2$, $SO_3$ or $PO_4$);

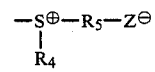

(wherein $R_4$ is an alkyl or cycloalkyl group having not more than 20 carbon atoms (particularly 1 to 6 carbon atoms) and optionally containing —O— and/or —COO— in the alkyl chain, $R_5$ is an alkylene group having not more than 8 carbon atoms and optionally containing any substituent and Z is $CO_2$, $SO_3$ or $PO_4$), etc. These are merely examples and not limitive, and any other zwitter-ionic group may be used.

Specific examples of the dispersing agent are as follows:

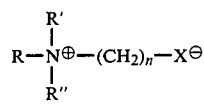

(wherein R is an ester, amide or aromatic alkyl group having a polymerizable ethylenic unsaturation or an alkyl group having not less than 8 carbon atoms (particularly 8 to 20 carbon atoms), R' and R" are each a hydrogen atom or an alkyl group having not more than 8 carbon atoms (particularly 1 to 6 carbon atoms), X is $SO_3$, $CO_2$ or $PO_4$ and n is an integer of 1 to 6);

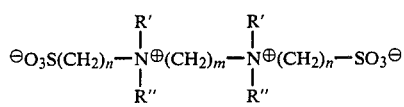

(wherein m is an integer of not less than 6 (particularly 6 to 15), and R', R" and n are each as defined above);

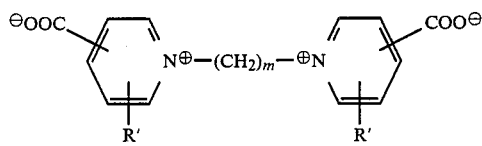

(wherein R' and m are each as defined above);

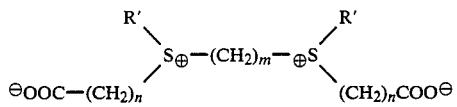

(wherein R', m and n are each as defined above);

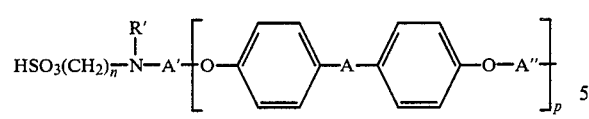

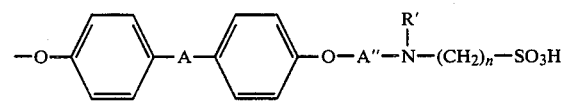

(wherein A is a straight or branched alkylene group having not more than 6 carbon atoms (particularly 1 to 4 carbon atoms), A' and A" are each a straight or branched alkylene group having not more than 6 carbon atoms (particularly 1 to carbon atoms), which may be optionally substituted with hydroxyl, and p is an integer of 1 to 20 (particularly 1 to 4) and R' and n are each as defined above);

An acrylic or polyester resin having a group of the formula:

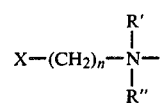

in the molecule (wherein R', R", X and n are each as defined above), etc.

Examples of the monomers as usable are as follows:
(a) Hydroxyl group-containing monomers (e.g. 2-hydroxyethyl acrylate, 3-hydroxypropyl acrylate, 2-hydroxyethyl methacrylate, 3-hydroxypropyl methacrylate, 4-hydroxybutyl methacrylate, allyl alcohol, methallyl alcohol);
(b) Carboxyl group-containing monomers (e.g. acrylic acid, methacrylic acid, crotonic acid, itaconic acid, maleinic acid, fumaric acid, their derivatives);
(c) Glycidyl group-containing monomers (e.g. glycidyl acrylate, glycidyl methacrylate);
(d) Alkyl acrylates or methacrylates (e.g. methyl acrylate, methyl methacrylate, ethyl acrylate, ethyl methacryate, n-butyl acrylate, n-butyl methacrylate, 2-ethylhexyl acrylate);
(e) Nitrogen-containing alkyl acrylate or methacrylates (e.g. N,N-dimethylaminoethyl acrylate, N,N-dimethylaminoethyl methacrylate);
(f) Polymeric amides (e.g. acrylamide, methacrylamide, n-butoxymethylacrylamide);
(g) Polymeric nitriles (e.g. acrylonitrile, methacrylonitrile);
(h) Polymeric aromatic compounds (e.g. styrene, alpha-methylstyrene, vinyltoluene, t-butylstyrene);
(i) alpha-Olefin compounds (e.g. ethylene, propylene);
(j) Vinyl compounds (e.g. vinyl acetate, vinyl propionate);
(k) Diene compounds (e.g. butadiene, isoprene). Polyfunctional monomers as exemplified below are also usable: ethyleneglycol diacrylate, ethyleneglycol dimethacrylate, triethyleneglycol dimethacrylate, tetraethyleneglycol dimethacrylate, 1,3-butylene.dimethacrylate, 1,3-butyleneglycol dimethacrylate, trimethylolpropane triacrylate, trimethylolpropane trimethacrylate, 1,4-butanediol acrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol acryloxymethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane methacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl trimellitate, diallyl terephthalate, diallyl phthalate, divinylbenzene, etc.

As the polymerization initiator, there may be used any conventional one. Specific examples are organic peroxides (e.g. benzoyl peroxide, t-butyl peroxide, cumene hydroperoxide), organic azo compounds (e.g. azobiscyanovaleric acid, azobisisobutyronitrile, azobis(2,4-dimethyl)-valeronitrile, azobis(2-aminopropane)hydrochloride), inorganic water-soluble radical initiators (e.g. potassium persulfate, ammonium persulfate, sodium persulfate, hydrogen peroxide), Redox type initiators such as combination of said inorganic water-soluble radical initiators with sodium pyrosulfite, sodium hydrogen sulfite, divalent iron ions, etc.

As the liquid medium, there is usually employed an aqueous medium. An oily solvent or an organic solvent may be also employed. The aqueous medium may consist of water alone or its mixture with any water-miscible organic solvent (e.g. methanol, ethanol, methylcellosolve, ethylcellosolve).

The polymerization may be carried out in the presence of said polymerization initiator in a liquid medium, particularly an aqueous medium, by adding dropwise a polymerizable monomer thereto. The amount of the polymerization initiator may be usually from 0.05 to 5% by weight, preferably from 0.1 to 3% by weight, to the amount of the monomer(s). The dispersing agent may be used in an amount of 0.1 to 10% by weight, preferably of 0.3 to 8% by weight, more preferably of 0.5 to 6% by weight on the basis of the monomer(s). The liquid medium may be employed in such an amount that the produced fine resin particles are included in a content of 2 to 65% by weight, especially of 20 to 60% by weight. When the liquid medium is an aqueous medium, an appropriate amount of a base may be incorporated therein so as to enhance the solubility of the dispersing agent. As the base, there may be used an alkali hydroxide, ammonia, an organic amine or the like, among which ammonia or a volatile organic amine is preferred. When desired, a conventional chain transfer agent such as a mercaptan (e.g. laurylmercaptan) may be also incorporated in the reaction system.

Any other operations and/or conditions for the polymerization may be those as conventionally adopted in the emulsion polymerization procedure.

As the result of the polymerization, there is obtained a dispersion wherein fine resin particles as the reaction product are dispersed stably. The fine resin particles are each constituted with the polymer produced from the monomer(s) as used in the polymerization and the dispersing agent surrounding such polymer. Usually, the fine resin particles have an average particle size of 100 to 1,500 Å when determined by the electron microscopic observation. Since the minimum particle size usually obtainable by emulsion polymerization is 0.2 micron (2,000 Å) or more, the resin particles as obtained in the above procedure may be understood to be extremely fine.

The above obtained dispersion comprising fine resin particles may be used as such as a dispersion stabilizer. Alternatively, the liquid solvent may be eliminated from the dispersion so as to collect fine resin particles, which may be used as a dispersion stabilizer. For instance, the dispersion may be subjected to spray drying or lyophilization so that fine resin particles having a good dispersibility into a liquid medium can be obtained.

The fine resin particles used as the dispersion stabilizer in this invention are characteristic in having a zwitter-ionic group in the molecule, of which the molecular weight is usually not less than 3,000. The fine resin particles may be used as the dispersion stabilizer in an isolated state or in a dispersed state in a liquid medium.

The pigment to be dispersed stably by the use of the dispersion stabilizer of the invention may be chosen from a wide variety of pigments including organic and inorganic pigments such as extender pigments, coloring pigments and metal powder pigments.

As the film-forming resins, there may be used any one conventionally employed for ordinary coating compositions. Their examples are natural oils, polyester resins, alkyd resins, unsaturated polyester resins, acryl resins, vinyl resins, epoxy resins, aminoplast resins, urethane resins, etc.

The dispersion stabilizer of this invention can exert a sufficient stabilization effect for aqueous and organic coating compositions. Therefore, the liquid medium may be chosen from water, hydrophilic solvents (e.g. methanol, ethanol, methyl cellosolve, ethyl cellosolve), hydrophobic solvents such as aromatic hydrocarbons (e.g. xylene, toluene), aliphatic hydrocarbons (e.g. hexane, heptane), ester solvents (e.g. butyl acetate) or ketone solvents (e.g. acetone, methyl ethyl ketone), etc. These solvents may be used alone or in combination.

For preparation of the coating composition comprising pigments particles stably dispersed therein, the components as stated above may be incorporated in an optional order with an optional proportion. Namely, the film-forming resin particles, the pigment particles, the dispersion stabilizer and the liquid medium may be incorporated in an optional order and mixed in a per se conventional procedure to make a coating composition. Preferably, the pigment particles are first dispered in the liquid medium in the presence of the dispersion stabilizer, and the resultant uniform mixture is admixed with the film-forming resin particles, followed by stirring to make a coating composition.

Usually, the dispersion stabilizer is used in an amount of from 0.01 to 30 parts by weight to 100 parts by weight of the solid particles to be dispersed such as pigment particles (in terms of solid components). In case of a pigment dispersed coating composition, the weight proportion of the pigment particles and the film-forming resin particles therein may be 0.005–5:1 (in terms of solid components), and the weight proportion of the dispersion stabilizer and the pigment particles + the film-forming resins may be 0.01–30:100 (in terms of solid components). Still, the concentration of solid components in the liquid medium may be usually from 1 to 80% by weight, although no particular limitation is present.

Practical and presently preferred embodiments of the invention are illustratively shown in the following Examples wherein % and part(s) are by weight unless otherwise indicated.

REFERENCE EXAMPLE 1

Preparation of fine resin particles having a zwitter-ionic group:

Into a reactor equipped with a stirrer and a temperature controller, deionized water (216 parts) was charged, and a mixture of azobiscyanovaleric acid (4.5 parts), dimethylethanolamine (4.28 parts) and deionized water (45 parts) was added thereto at 80° C. while stirring. At the same temperature as above, a first mixture of N,N-dimethyl-N-(3-sulfopropyl)-N-methacrylethylammonium betaine (6 parts), 2-hydroxyethyl acrylate (6 parts) and deionized water (90 parts) and a second mixture of methyl methacrylate (77.4 parts), n-butyl acrylate (103.2 parts), styrene (77.4 parts), 2-hydroxyethyl acrylate (24 parts) and ethylene glycol dimethacrylate (6 parts) were dropwise added therein in 60 minutes. To the resulting mixture, a mixture of azobiscyanovaleric acid (1.5 parts), dimethylethanolamine (1.42 parts) and deionized water (1.5 parts) was added at the same temperature as above, and stirring was continued for 60 minutes, whereby an emulsion having a content of non-volatile components of 45%, a pH of 7.8, a viscosity of 68 cps (at 25° C.) and an average particle size of 0.116 micron giving a single peak in particle size distribution was obtained.

The emulsion was subjected to spray-drying to give fine resin particles.

REFERENCE EXAMPLE 2

Preparation of fine resin particles having a zwitter-ionic group:

In the same procedure as in Refernece Example 1 but using a mixture of N-methyl-N-(vinylbenzyl)taurine (15 parts), dimethylethanolamine (5.3 parts), 2-hydroxyethyl acrylate (6 parts) and deionized water (90 parts) as a first mixture and a mixture of methyl methacrylate (195 parts), 2-ethylhexyl acrylate (60 parts) and 2-hydroxyethyl acrylate (24 parts) as a second mixture, polymerization was carried out to produce an emulsion having a content of non-volatile components of 45%, a pH of 7.2 and an average particle size of 0.13 micron.

REFERENCE EXAMPLE 3

(a) Preparation of a polyester resin having a zwitter-ionic group:

Into a reactor of 2 liter volume equipped with a stirrer, a nitrogen gas introducing pipe, a temperature controller, a condenser and a decanter, bis(hydroxyethyl)-taurine (134 parts), neopentyl glycol (130 parts), azelaic acid (236 parts), phthalic anhydride (186 parts) and xylene (27 parts) were charged, and the temperature was elevated. The water as produced was azeotropically distilled out with xylene. The temperature was brought up to 190° C. in about 2 hours from the start of the distillation, and stirring and water elimination were continued until the acid value in terms of carboxyl group becomes 145. The reaction mixture was cooled to 140° C. While keeping this temperature, glycidyl bersadate ("Cardula E 10" manufactured by Shell Oil) (314 parts) was dropwise added thereto, followed by stirring for 2 hours. The produced polyester resin had an acid value of 59, a hydroxyl value of 90 and a number average molecular weight of 1,054.

(b) Preparation of fine resin particles having a zwitter-ionic group:

Into a reactor of 1 liter volume equipped with a stirrer, a cooler and a temperature controller, deionized water (297 parts), the polyester resin as obtained in (a) (40 parts) and dimethylethanolamine (3.0 parts) were charged, and stirring was effected at 80° C. to make a solution. To the resulting a solution, a mixture of azobiscyanovaleric acid (1.5 parts), dimethylethanolamine (1.5 parts) and deionized water (50 parts) was added thereto. A mixture of styrene (160 parts) and ethyleneglycol dimethacrylate (40 parts) was dropwise added thereto in 60 minutes. To the resultant mixture, a mixture of azobiscyanovaleric acid (0.5 part), dimethylethanolamine (0.5 part) and deionized water (10 parts) was added, and stirring was continued at 80° C. for 60 minutes, whereby an emulsion having a content of non-volatile components of 38%, a pH of 7.2 and an average particle size of 0.04 micron was obtained.

The emulsion was charged in a 2 liter volume decanter, and azeotropic distillation was carried out under reduced pressure to eliminate water together with xylene. The dispersion medium was thus replaced by xylene to obtain a dispersion containing non-volatile components in a content of 20%.

REFERENCE EXAMPLE 4

(a) Preparation of a modified epoxy resin having a zwitter-ionic group

In a reactor as used in Reference Example 1, taurine sodium salt (73.5 parts), ethylene glycol (100 parts) and ethylene glycol monomethyl ether (200 parts) were charged, and the temperature was elevated to 120° C. while stirring. After the contents became a uniform solution, a mixture of an epoxy resin of bisphenol diglycidyl ether type ("Epicoat 1001" manufactured by Shell Chemical; epoxy equivalent, 470) (470 parts) and ethylene glycol monomethyl ether (400 parts) was dropwise added thereto in 2 hours. Heating and stirring were continued for 2 hours. The reaction product was purified and dried to give a modified epoxy resin (518 parts), of which the acid value as determined by KOH titration was 49.4 and the ion content determined by fluoroescent X ray analysis was 2.8%.

(b) Preparation of fine resin particles having a zwitter-ionic group:

Into a reactor as used in Reference Example 1, deionized water (297 parts), the modified epoxy resin as obtained in (a) (40 parts) and dimethylethanolamine (5 parts) were charged, and stirring was effected at 80° C. to make a solution. To the resulting a solution, a mixture of azobiscyanovaleric acid (1.5 parts), dimethylethanolamine (1.5 parts) and deionized water (50 parts) was added thereto. While maintaining the temperature at 80° C., a mixture of methyl methacrylate (180 parts) and ethylene glycol (20 parts) was dropwise added thereto in 120 minutes. To the resultant mixture, a mixture of azobiscyanovaleric acid (0.5 part), dimethylethanolamine (0.5 part) and deionized water (10 parts) was added, and stirring was continued at 80° C. for 60 minutes, whereby an emulsion having a content of non-volatile components of 38 %, a pH of 7.2 and an average particle size of 0.03 micron was obtained.

To the emulsion (200 parts), isopropanol (250 parts) was added. The produced precipitate was collected by filtration and redispersed in butyl acetate to make a dispersion containing non-volatile components in a content of 25%.

REFERENCE EXAMPLE 5

Preparation of an acrylic resin varnish:

Into a reactor equipped with a stirrer, a temperature controller and a reflux cooler, toluene (710 parts) and n-butanol (200 parts) were charged, and a solution (200 parts) having the following composition was added thereto, followed by elevation of the temperature while heating under stirring:

| | |
|---|---|
| Methacrylic acid | 12 parts |
| Styrene | 264 parts |
| Methyl methacrylate | 264 parts |
| n-Butyl acrylate | 360 parts |
| 2-Hydroxyethyl acrylate | 100 parts |
| Azobisisobutyronitrile | 20 parts |
| n-Dodecylmercaptan | 20 parts |
| Total: | 1040 parts |

To the resulting mixture, the above solution (810 parts) was dropwise added in 2 hours while reflux. Then, a mixture of azobisisobutyronitrile (3 parts) and toluene (100 parts) was dropwise added thereto in 30 minutes. Stirring was continued while reflux for 2 hours so as to enhance the conversion into the resin, whereby an acrylic resin varnish containing non-volatile components in a content of 50 % was obtained. The number average molecular weight of the produced resin contained therein was 3,800.

REFERENCE EXAMPLE 6

Preparation of an alkyd resin varnish:

Into a reactor equipped with a stirrer, a temperature controller and a decanter, the following materials were charged, and heating was carried out while stirring:

| Dehydrated castor oil | 260 parts |
|---|---|
| Palm oil | 192 parts |
| Trimethylolpropane | 403 parts |
| Diethylene glycol | 65 parts |
| Phthalic anhydride | 578 parts |
| Xylene | 45 parts |

Water as produced on the progress of the reaction was distilled out azeotropically with xylene. Heating was continued until the acid value and the hydyoxyl value show respectively 10 and 100. The resulting resin solution was diluted with xylene to make a content of non-volatile components of 70%. The thus obtained alkyd resin varnish showed a Gardner viscosity of Z.

REFERENCE EXAMPLE 7

Preparation of an acrylic resin varnish:

Into a reactor equipped with a stirrer, a temperature controller and a cooler, ethylene glycol monobutyl ether (76 parts) was charged, and a monomer mixture (61 parts) of styrene, methyl methacrylate, 2-hydroxyethyl methacrylate, n-butyl acrylate, methacrylic acid, laurylmercaptan and azobisisobutyronitrile in a weight proportion of 45:63:48:117:27:3:3 was added thereto. The temperature was elevated to 120° C. while stirring. The same monomer mixture as above (245 parts) was dropwise added thereto in 3 hours, and stirring was continued for 1 hour. Dimethylethanolamine (28 parts) and deionized water (200 parts) were added to the reaction mixture to obtain an acrylic resin varnish containing non-volatile components in a content of 50%. The number average molecular weight of the resin contained therein was 6,000.

REFERENCE EXAMPLE 8

Preparation of a resin emulsion:

Into a reactor equipped with a stirrer, a temperature controller and a cooler, deionized water (1100 parts) was charged, and the temperature was elevated to 80° C. A solution of ammonium persulfate (6 parts) and deionized water (100 parts) and a monomer mixture (5 parts) of methyl methacrylate, 2-ethylhexyl acrylate and n-dodecylmercaptan in a weight proportion of 210:75:15 were added thereto, followed by stirring for 5 minutes. Then, the same monomer mixture as above (259 parts) was dropwise added thereto in 1 hour. After the dropwise addition was completed, stirring was continued for 15 minutes. A solution of ammonium persulfate (1 part) in deionized water (10 parts) was added thereto, followed by stirring for 1 hour to give a seed emulsion containing non-volatile conents in a content of 20%.

Into the same reactor as above, deionized water (300 parts) and the seed emulsion (25 parts) were charged, and the temperature was adjusted to 80° C. A solution of ammonium persulfate (0.1 part) in deionized water (20 parts) was added thereto while stirring. Then, a pre-emulsion of methyl methacrylate (360 parts), 2-ethylhexyl acrylate (105 parts), 2-hydroxyethyl acrylate (35 parts), n-dodecylmercaptan (5 parts), deionized water (200 parts), sodium dodecylbenzenesulfonate (0.4 part) and ammonium persulfate (0.8 parts) was added to the resulting mixture in 2 hours. After completion of the dropwise addition, stirring was continued for 30 minutes. A solution of ammonium persulfate (0.2 part) in deionized water (20 parts) was dropwise added thereto, followed by stirring for 1 hour.

The thus obtained emulsion contained non-volatile components in a content of 48.5%. By the microscopic observation, the average particle size and the maximum particle size of the resin particles therein were determined to be 0.7 micron and 1.4 microns, respectively. The number average molecular weight of the resin was 9,800.

EXAMPLE 1 AND COMPARATIVE EXAMPLE 1

Preparation of the coating composition:

Into a stainless made beaker, the materials under Composition 1 in Table 1 were charged, and stirring was carried out by the aid of a laboratory mixer. To the resulting mixture, the materials under Composition 2 in Table 1 were added, and stirring was effected to make a metallic coating composition.

TABLE 1

|  |  | Example 1 | Comparative Example 1 |
|---|---|---|---|
| Composition 1 | Dispersion of Reference Example 3 | 15 | — |
|  | Aluminum paste(*1) | 1.5 | 1.5 |
| Composition 2 | Acrylic resin varnish of Reference Example 5 | 200 | 200 |
|  | n-Butanol-modified melamine resin | 25 | 25 |

Note:
(*1) Composition comprising aluminum flake (64%), stearic acid (1%) and mineral spirit (35%).

Appearance of the coating film:

The coating composition as above obtained was applied onto a steel plate and baked at 150° C. for 30 minutes to make a coating film of 40 microns in thickness. The coating film with the coating composition according to Example 1 is better than that with the coating composition according to Comparative Example 1 in metal feeling. Still, dispersing of the aluminum pigment could be made more smoothly in the coating composition according to Example 1 than in the coating composition according to Comparative Example 1.

Stability of the coating composition:

The coating composition as above obtained was allowed to stand at 40° C. In the coating composition of Comparative Example 1, pigment particles were deposited and coagulated in 2 weeks to make a hard cake. In the coating composition of Example 1, pigment particles were not materially deposited even after 2 weeks, and the original dispersion state could be readily recovered by stirring.

Example 2 and Comparative Example 2

Preparation of the coating composition:

Into a paint conditioner, the materials under Composition 3 in Table 2 were charged, and stirring was carried out with addition of the same amount of glass beads for 30 minutes. To the resulting mixture, the materials under Composition 4 in Table 2 were added, and stirring was effected for 30 minutes to make a white coating composition.

TABLE 2

|  |  | Example 2 | Comparative Example 2 |
|---|---|---|---|
| Composition 3 | Acrylic resin varnish of Reference Example 6 | 143 | 143 |
|  | Resin particle of Reference Example 1 | 30 | — |
|  | n-Butanol-modified melamine resin | 25 | 25 |
| Composition 4 | Rutile type titanium oxide pigment | 100 | 100 |

Appearance of the coating film:

In the same manner as in Example 1, the coating composition as above obtained was applied to make a coating film of 40 microns in thickness. The gloss measured at 60° of the resulting coating film was 99 in case of Example 2 and 93 in case of Comparative Example 2.

Stability of a coating composition:

The coating composition as above obtained was allowed to stand at 40° C. for 4 weeks. In the coating composition of Comparative Example 2, pigment particles were deposited to make a soft coagulate. In the coating composition of Example 2, pigment particles did not produce any material change.

EXAMPLES 3 and 4 and COMPARATIVE EXAMPLES 3 and 4

Preparation of the coating composition

Into a paint conditioner, the materials as shown in Table 3 were charged, and stirring was carried out with addition of glass bead for 1 hour to make a coating composition.

TABLE 3

|  | Example | | Comparative Example | |
|---|---|---|---|---|
|  | 3 | 4 | 3 | 4 |
| Acrylic resin varnish of Reference Example 5 | 200 | — | 200 | — |
| Acrylic resin varnish of Reference Example 7 | — | 200 | — | 200 |
| Dispersion of Reference Example 4 | 10 | — | — | 10 |
| Emulsion of Reference Example 2 | — | 10 | — | — |
| Hexamethoxymethylolmelamine | 25 | 25 | 25 | 25 |
| Quinacridone type pigment (yellow) | 3 | — | 3 | — |
| Phthalocyanine blue pigment (blue) | — | 20 | — | 10 |

Appearance of the coating film and stability of the coating composition

In the same manner an in Example 1, the appearance of the coating film and the stability of the coating composition were observed. The results are shown in Table 4.

TABLE 4

| Example | Gloss at 60° | Stability of coating composition (40° C. × 4 weeks) |
|---|---|---|
| Example 3 | 98 | No material change observed. |
| Example 4 | 99 | Pigment particles deposited to make a soft cake, but the initial state readily recovered by stirring. |
| Comparative Example 3 | 92 | Pigment particles deposited and coagulated to make a hard cake. |
| Comparative Example 4 | 90 | Pigment particles deposited and coagulated to make a hard cake. |

EXAMPLE 5 AND REFERENCE EXAMPLE 5

Preparation of coating composition:

Into a stainless steel made beaker, the materials as shown in Table 5 were charged, and stirring was carried out by the aid of a laboratory mixer to make an aqueous emulsion composition.

TABLE 5

|  | Example 5 | Comparative Example 5 |
|---|---|---|
| Acrylic resin varnish of Refererence Example 7 | 140 | 140 |
| Emulsion of Reference Example 8 | 60 | 60 |
| Emulsiion of Reference Example 4 | 16 | — |

Stability of the emulsion composition:

The aqueous emulsion composition as above obtained was allowed to stand at 40° C. for 1 month. The emulsion composition of Comparative Example 5 gave a soft cake, while that of Example 5 did not produce any change.

What is claimed is:

1. A dispersion stabilizer for dispersing solid particles into a liquid medium, which comprises resin particles bearing a zwitter-ionic group in the molecule, said resin particles each having substantially an average particle size of not more than 1500 Å on measurement by electron microscopic observation.

2. The dispersion stabilizer according to claim 1, wherein the resin particles are those prepared by polymerizing a monomer having at least one polymerizable ethylenic unsaturation with or without any other monomer copolymerizable therewith in a liquid medium in the presence of a dispersing agent having at least one zwitterionic group in the molecule.

3. The dispersion stabilizer according to claim 2, wherein the polymerization is emulsion polymerization.

4. The dispersion stabilizer according to claim 1, which is in the form of a dispersion.

5. The dispersion stabilizer according to claim 1, which is in fine particulate form.

6. The dispersion stabilizer according claim 1, wherein the resin particles have a molecular weight of not less than 3,000.

7. A dispersion composition which comprises a uniform mixture of solid particles and the dispersion stabilizer according to claim 1.

8. The dispersion composition according to claim 7, wherein the solid particles are pigment particles.

9. The dispersion composition according to claim 7, wherein the solid particles are polymer particles.

10. The dispersion composition according to claim 7, wherein the weight proportion of the solid particles and the dispersion stabilizer is 100:0.01–30 in terms of solid components.

11. A dispersion composition which comprises a uniform mixture of solid particles, a liquid medium and the dispersion stabilizer according to claim 1.

12. The dispersion composition according to claim 11, wherein the solid particles are pigment particles.

13. The dispersion composition according to claim 11, wherein the solid particles are polymer particles.

14. The dispersion composition according to claim 11, which is used as a coating composition.

15. A method for preparation of a stable dispersion composition comprising solid particles uniformly dispersed in a liquid medium, which comprises mixing the solid particles, the liquid medium and the dispersion stabilizer according to claim 1 in an optional order.

16. The method according to claim 15, wherein the solid particles are pigment particles.

17. The method according to claim 15, wherein the weight proportion of the solid particles and the dispersion stabilizer is 100:0.01–30 in terms of solid components.

18. The method according to claim 15, wherein the concentration of solid components in the liquid medium is from 1 to 80% by weight.

* * * * *